United States Patent
Uzel et al.

(10) Patent No.: US 12,284,408 B1
(45) Date of Patent: Apr. 22, 2025

(54) DISTRIBUTED DYNAMIC CONTENT RESTRICTION SYSTEM

(71) Applicant: Twitch Interactive, Inc., San Francisco, CA (US)

(72) Inventors: Remi Kaan Uzel, London (GB); Randeep S Bhatia, Berkeley, CA (US); Christopher Renshaw Fortier, Austin, TX (US)

(73) Assignee: Twitch Interactive, Inc., San Francisco, CA (US)

( * ) Notice: Subject to any disclaimer, the term of this patent is extended or adjusted under 35 U.S.C. 154(b) by 243 days.

(21) Appl. No.: 17/301,498

(22) Filed: Apr. 5, 2021

(51) Int. Cl.
*H04N 21/258* (2011.01)
*H04L 65/612* (2022.01)
*H04N 21/254* (2011.01)
*H04N 21/454* (2011.01)

(52) U.S. Cl.
CPC ..... *H04N 21/25875* (2013.01); *H04L 65/612* (2022.05); *H04N 21/2541* (2013.01); *H04N 21/454* (2013.01)

(58) Field of Classification Search
CPC ......... H04N 21/25875; H04N 21/2541; H04N 21/454; H04L 65/612
See application file for complete search history.

(56) References Cited

U.S. PATENT DOCUMENTS

| | | | |
|---|---|---|---|
| 9,027,143 B1 * | 5/2015 | Agrawal | H04L 63/08 380/232 |
| 2011/0289601 A1 * | 11/2011 | Bellwood | G06F 21/10 726/30 |
| 2013/0298151 A1 * | 11/2013 | Leske | H04L 65/611 725/116 |
| 2017/0111711 A1 * | 4/2017 | Deuel | H04N 21/44008 |
| 2017/0279757 A1 * | 9/2017 | Kereth | H04L 51/52 |
| 2018/0192101 A1 * | 7/2018 | Bilobrov | G06F 21/16 |
| 2020/0084231 A1 * | 3/2020 | Burriesci | H04L 63/1416 |
| 2020/0177938 A1 * | 6/2020 | Zeng | H04N 21/25875 |
| 2022/0247575 A1 * | 8/2022 | Bansal | G06N 20/00 |

* cited by examiner

*Primary Examiner* — Shean Tokuta
*Assistant Examiner* — Juan C Turriate Gastulo
(74) *Attorney, Agent, or Firm* — Knobbe Martens Olson & Bear LLP (57) ABSTRACT

A content management system is provided to provide dynamic identification, selection, and application of content restriction response actions to streaming content. Portions of streaming content may be associated with a restriction regarding usage of the portion in the streaming content. As a content creator is generating a stream of content, a content management system can automatically detect any restrictions that are applicable to the content. The content management system can automatically determine and present to the content creator a set of available actions that may be taken in response to detection of the restrictions.

19 Claims, 6 Drawing Sheets

DISTRIBUTED DYNAMIC CONTENT RESTRICTION SYSTEM

BACKGROUND

Computing devices can utilize communication networks to exchange data. One computing device (the source computing device) transmits data to another computing device (the destination computing device). In a common scenario, the data may represent multimedia content. For example, the source computing device may capture audio to generate an audio data signal, and capture video to generate a video data signal. The source computing device may then send multimedia data, based on the audio data signal and video data signal, over a network to one or more destination computing devices. The multimedia data may be sent at a future time (e.g., as a recording of prior events) or in real time (e.g., as a live stream of the audio and video captured by the source device). Destination computing devices may present the multimedia data using various output devices.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to dynamic identification, selection, and application of content restriction response actions to streaming content. Streaming content, such as audiovisual or other multimedia content, may include one or more tracks or other portions (e.g., one or more video tracks, one or more audio tracks, metadata, subtitles, etc.). The content as a whole and/or individual tracks of the content may be associated with various restrictions on how and/or under what circumstances the content may be distributed, stored, consumed, or the like. For example, live streaming may be authorized for a track (or portion of a track), while storage and future on-demand access may be restricted. As a content creator is generating a stream of content that is available for distribution to content consumers in real time and may also be stored for subsequent on-demand access, a content management system can automatically detect any restrictions that are applicable to the content or individual tracks or portions thereof. The content management system can automatically determine and present to the content creator a set of available actions that may be taken in response to detection of the restrictions. In this way, content creators can themselves take steps to apply content restriction response actions during content creation (e.g., as the potentially restricted content is being included in the content creator's real-time stream).

As used herein, the term "real time" is used according to its usual and customary meaning in computing and networking, and refers to the effectively contemporaneous nature of the events being described. In computing environments, events in different locations on a network, or different events within a single computing device, rarely occur at exactly the same time. There may be an offset in timing due to latencies inherent in network communications, computer processing, and the like. Thus, the term "real time" does not necessarily equate to "exactly the same time," but rather the observed effect of two or more events occurring at approximately the same time for practical purposes and when factoring in network communication and processing. Thus the concept of "real time" is often referred to herein as "substantially real time."

As used herein, the terms "streaming content," "content stream" and "stream" are used according to their usual and customary meaning in computing and networking. The terms refer to content that is delivered in substantially real time as it is created and/or content that is presented in substantially real time as it is received, without first requiring transmission of a complete file for the entirety of the content item. As used herein, the term "live stream" is used according to its usual and customary meaning in computing and networking, and refers to streaming content that is presented in real time or substantially real-time as it is being recorded or otherwise generated. The concept of "live stream" content may be understood by way of contrast with "on demand" content, the presentation of which may also be accomplished through a stream. Whereas both "live stream" and "on-demand" streaming content may be delivered to and presented by a consumer device substantially simultaneously without requiring a complete download of the content file being presented, "on-demand" streaming content is streamed from a content data store after it is created and stored. For example, on-demand streaming content may be available for streaming a significant period of time after its creation (e.g., days or years later), where the period of time is not solely due to networking and processing latencies. In contrast, live stream content is delivered and presented in substantially real time as it is being created, though in some cases delivery of live stream content may experience delays in delivery to consumer devices for presentation (e.g., delays of seconds or minutes due to networking or computing latencies, substantial processing, and/or implementation of moderation polices).

Some conventional content management systems manage the application of restrictions to on-demand content by allowing content producer systems to create content for distribution to content consumers, and then preventing distribution of the content if it is restricted. For example, portions of content may be subject to security restrictions that prohibit distribution, or portions may be subject to copyright protection and the copyright holder may not authorize distribution of the copyrighted portion. A conventional content management system may analyze content after it is stored, and determine whether the content is (or includes) restricted content. If the content is (or includes) restricted content, a conventional content management system may take measures to block future distribution of—or access to—the restricted content. In some cases, the content may be blocked altogether. However, blocking the content altogether may not be desirable because it eliminates the opportunity for any consumption of the content, even if a significant amount of the content is not restricted or is otherwise not subject to applicable restriction-based controls. In other cases, such as when the content includes an audio portion with some amount of restricted content while the video portion includes no restricted content, a conventional content management system may mute the content so that the restricted audio content is effectively prevented from being distributed or accessed. However, muting the entire audio portion of the content may not be desirable because it may excessively impact the consumption experience, even if a significant amount of the audio is not restricted or is otherwise not subject to applicable restriction-based controls. Moreover, blocking or muting content after it has been stored for on-demand distribution does not address content that may have already been distributed to consumers (e.g., if the content was live streamed to consumers in substantially real-time as the content was produced). Some conventional content management systems do not perform automatic content restriction detection at all, and instead rely upon restricted content managers (e.g., other content creators or managers of pre-existing content) to assert content restrictions after content has already been created, stored, and potentially distributed. However, this reactive approach may not be satisfactory to content producer system users who are not aware of the content restrictions, or when only a small portion of the content is restricted, but the applied action is muting or complete prohibition of the content from distribution.

Some aspects of the present disclosure address the issues above, among others, through the use of automatic restricted content detection in real time or substantially real time as streaming content is being produced. Illustratively, a particular streaming content item produced by a content producer system may include any number of portions, such as a video portion (e.g., output of a video camera or a screen capture system), a primary audio portion (e.g., user commentary), an auxiliary audio portion (e.g., background music), and/or one or more supplemental portions (e.g., subtitles, metadata, etc.). A content producer system—also referred to simply as a "content producer" and distinct from a user of the content producer system—may package the streaming content into a multi-track data stream for transmission to a content management system, or the content producer may send the streaming content to the content management system as separate streams for each individual track or other portion of the content. In addition to distributing the streaming content to content consumers as a live stream and/or storing an on-demand version of the streaming content for subsequent distribution, the content management system may analyze the streaming content as it is received from the content producer. In some embodiments, the content management system may include one or more streaming content analysis subsystems that analyze streaming content as it is produced or received. For example, the content management system may include a content identification system based on "digital fingerprinting" to identify content that has the same digital fingerprint as content known to be subject to one or more restrictions. If such a digital fingerprint is detected upon scanning streaming content provided by a content producer, the content management system may determine and present options in real time or substantially real time to the content producer to take action regarding the content restriction (e.g., dispute the restriction, assert or obtain proper authorization required by the restriction, or stop including the restricted content in the stream). Presentation of such options in real time as the content producer is producing the content stream allows for more efficient and effective application of content restrictions and response actions.

In some embodiments, some or all of the streaming content may originate, at least in part, at the content management system rather than being received from a content producer in a content stream. For example, the content management system may provide a library of content available to content producers to be included in their streaming content, such as songs, videos, and the like. A content producer may wish to include one of the songs in a content stream. Rather than the song being included in an audio stream that is sent from the content producer system as part of the streaming content item being produced, the content producer user may select the song from a library of content available via the content management system. The content management system may provide the song to the content producer system for playback at the content producer system during creation of the streaming content so that the user of the content producer system can hear the song at the same point in the live stream that content consumers will hear the song. The song may also be included by the content management system in the streaming content item for live stream distribution and/or on-demand storage. However, to include the song in the streaming content item for live stream distribution and or on-demand storage, the content management system may insert the song from the content management system's own library into the streaming content item without receiving audio of the song from the content producer. In this implementation, the content management system may identify restricted content, and corresponding restrictions for the restricted content, based on selection of the song (or other content-management-system-provided content) to be included in the streaming content. For example, the content management system may identify restricted content based on metadata associated with content to be included and indicating the identity and/or restrictions assigned to the content. Thus, scanning an audio or video stream for digital fingerprints associated with restricted content may not be necessary.

In some embodiments, the content management system may employ a hybrid implementation. For example, some portions of content, as they are created, are scanned using one or more content analysis subsystems that analyze streaming content for digital fingerprints of restricted content at the content creator system and/or by the content management system. Other portions of content are provided by the content management system, and the content management system identifies use of restricted content based on metadata associated with content to be included.

Additional aspects of the present disclosure relate to automatically determining which content restriction response actions—also referred to simply as "response actions"—are available for a content item, and presenting the available actions to content producers in real time as streaming content is being produced. Once restricted content is identified (whether streamed from a content producer or selected by a user for the content management system to include), the content management system can determine the specific restriction(s) applicable to the restricted content, the specific action(s) available to content producer system users to address the restriction(s), etc. The content management system can then provide options to the content production system regarding the action(s) available to address the restriction(s). In some embodiments, the available actions may include any or all of the following: [1] indicate that the restriction does not apply; [2] indicate that authorization for the restricted use has already been obtained; [3] obtain authorization for the restricted use; [4] stop including the restricted content in the content stream being produced. For example, a user may be generating a content stream with a video track from a camera of the content production system, and an audio track from a microphone of the content production system. The video track and audio track may not be associated with any content restrictions because they are being generated in real time as recordings of what the user is doing. However, the content stream may include secondary audio that is a pre-recorded song. The song may be included in the audio track (e.g., it is being played back near the microphone) or it may be a separate audio track (e.g., included in the streaming content by the content production system or inserted by the content management system based on selection of the song for inclusion). The song may be associated with a content restriction that prohibits the song from being recorded for on-demand streaming without prior authorization. Once the content management system detects the song as being part of the content stream being generated, the content management system may determine the restrictions applicable to the song (e.g., based on metadata associated with the song, based on a database or service that maintains restrictions, etc.). The actions available in this example may include each of the four sample actions mentioned above. A user may choose one of the actions, such as action [1] for assertion that the potential restriction does not apply (e.g., the restriction is a copyright restriction regarding on-demand streaming, and the user indicates that use of the restricted content is permitted under the doctrine of fair use). Based on selection of the response action, the content management system may execute accordingly. In this example, the content management system may permit the song to be included in the stream, and may record data representing the assertion that the restriction does not apply. If a restricted content manager of the song subsequently makes an assertion that use of the song was restricted, the content management system can access the data representing the content producer system user's assertion that the restriction does not apply. The content management system may then present the assertion to the restricted content manager.

Further aspects of the present disclosure relate to dynamic selection of restriction response actions based on aspects of the content production system user and/or aspects of the restricted content. In some embodiments, a content production system user may have certain attributes, such as a certain account type with the content management system, a timespan of account membership with the content management system, etc. When that user is generating a content stream with a restricted content item detected by the content management system, the content management system may begin the process of determining the available response actions. The available actions may be filtered or augmented based on attributes of the user. For example, if the user is associated with a timespan of account membership that satisfies a criterion (e.g., meets or exceeds a threshold), the user may be permitted to assert that the restriction does not apply. However, if the timespan of account membership fails to satisfy the criterion, then the user may not be permitted to assert that the restriction does not apply and may be required to choose a different action, such as obtaining authorization to use the restricted content, or stopping use of the restricted content.

Various aspects of the disclosure will now be described with regard to certain examples and embodiments, which are intended to illustrate but not limit the disclosure. Although aspects of some embodiments described in the disclosure will focus, for the purpose of illustration, on particular examples of content streams, restrictions, response actions, and the like, the examples are illustrative only and are not intended to be limiting. In some embodiments, the techniques described herein may be applied to additional or alternative content streams, restrictions, response actions, and the like.

Streaming Content Creation Environment

Figure 1:
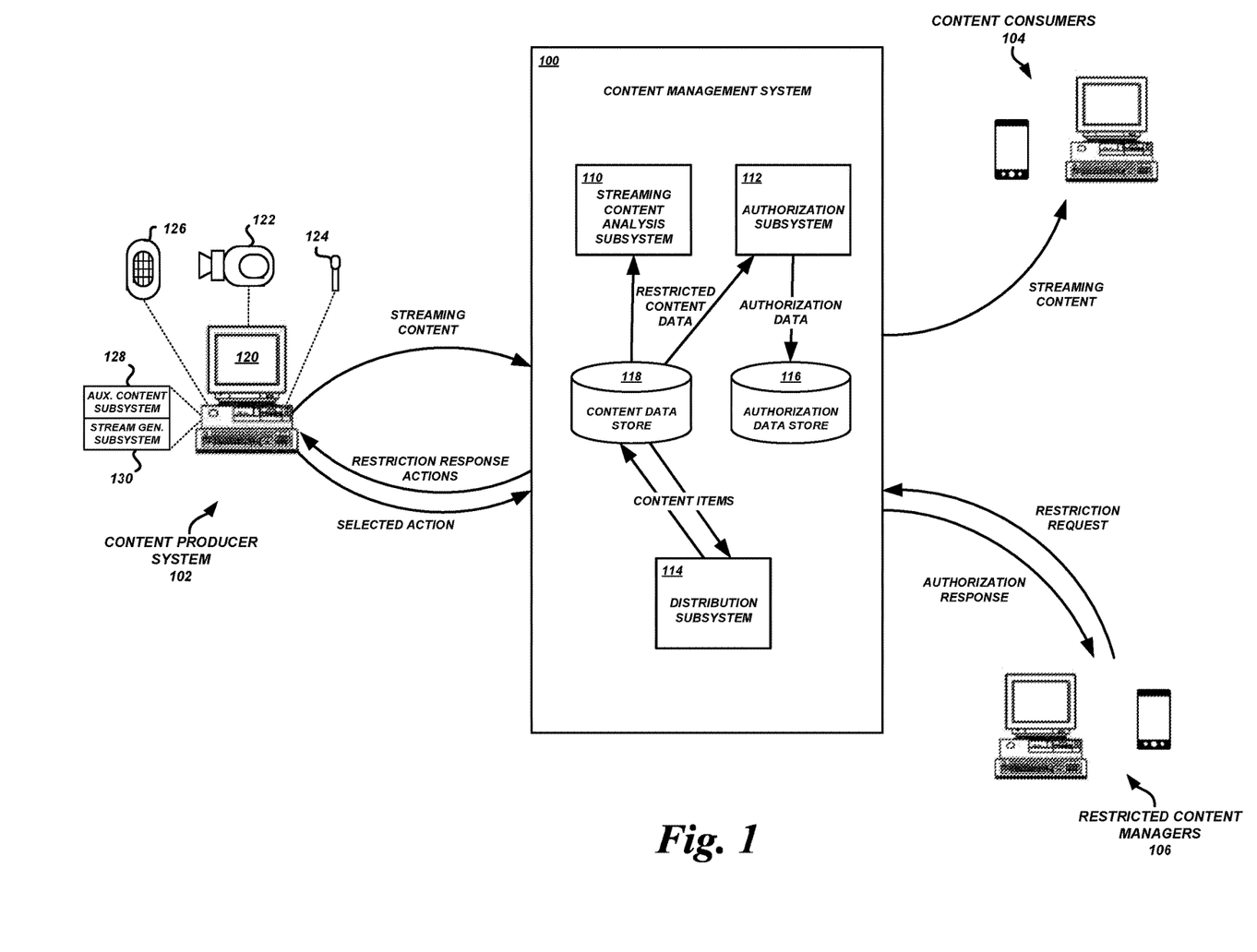
FIG. 1 is a block diagram illustrating various data flows and interactions between a content producer system, a content management system, one or more content consumer systems, and one or more restricted content manager systems according to some embodiments.

With reference to an illustrative embodiment, FIG. 1 shows an example network environment in which aspects of the present disclosure may be implemented. In some embodiments, as shown, the network environment may include a content management system 100 (also referred to as a "content manager"), any number of content production systems 102 (also referred to as "content producers"), any number of content consumption systems 104 (also referred to as "content consumers"), and any number of restricted content manager systems 106 (also referred to as "restricted content managers"). The content manager 100, content producer(s) 102, content consumer(s) 104, and restricted content managers 106 may communicate with each other via one or more communication networks.

In some embodiments, a communication network (also referred to simply as a "network") may be a publicly-accessible network of linked networks, possibly operated by various distinct parties, such as the Internet. In some cases, the network may be or include a private network, personal area network, local area network, wide area network, global area network, cable network, satellite network, cellular data network, etc., or a combination thereof, some or all of which may or may not have access to and/or from the Internet.

The content management system 100 may be a logical association of one or more computing devices for ingesting, processing, storing, and distributing streaming content. For example, the content management system 100 can include a streaming content analysis subsystem 110 (also referred to simply as a content "content analysis subsystem" for convenience) for analyzing streaming content to detect the presence of a content portion that may be associated with a restriction. Advantageously, the content analysis subsystem 110 may perform the analysis as the content portion is received from a content producer 102 or selected for inclusion in streaming content to be stored or distributed. The content management system 100 may also include an authorization subsystem 112 for managing authorization to use content portions associated with restrictions in content streams that are provided as live streams or on-demand streams to content consumers 104. The content management system 100 may also include a distribution subsystem 114 for managing the distribution of various streams of content to content consumers 104. The content management system 100 may also include an authorization data store 116 for storing data regarding authorizations obtained or asserted to overcome restrictions on content portions included in content streams. The content management system 100 may also include a content data store 118 for storing versions of content that are to be distributed in distribution channels other than "live stream" channels.

The content management system 100 (or individual components thereof, such as the content analysis subsystem 110, the authorization subsystem 112, the distribution subsystem 114, the authorization data store 116, the content data store 118, etc.) may be implemented on one or more physical server computing devices. In some embodiments, the content management system 100 (or individual components thereof) may be implemented on one or more host devices, such as blade servers, midrange computing devices, mainframe computers, desktop computers, or any other computing device configured to provide computing services and resources. For example, a single host device may execute one or more content analysis subsystems 110, authorization subsystems 112, distribution subsystems 114, authorization data stores 116, content data stores 118, some combination thereof, etc. The content management system 100 may include any number of such hosts.

In some embodiments, the features and services provided by the content management system 100 may be implemented as web services consumable via one or more communication networks. In further embodiments, the content management system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

A content consumer 104 may be any of a wide variety of electronic devices with content presentation capabilities, including televisions, personal computing devices, laptop computing devices, tablet computing devices, electronic reader devices, wearable computing devices, mobile devices (e.g., cellular and other mobile phones, smart phones, media players, handheld gaming devices, etc.), set-top boxes, streaming media devices, smart home appliances, and various other electronic devices and appliances.

In some embodiments, a restricted content manager 106 may be or include a content consumer 104. In some embodiments, a restricted content manager 106 may be a separate system, such as a separate personal computing device, laptop computing device, tablet computing device, or the like.

A content producer 102 may include any of a wide variety of computing devices 120, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. The computing device 120 may provide processing and network communication capabilities to facilitate the generation and transmission streaming content to the content management system 100. The content producer 102 may have various input and/or output components that may be integrated into or in communication with the computing device 120. For example, the content producer 102 may include a camera 122 (or other image sensor) to generate video or other image data, a microphone 124 (or other audio sensor) to generate audio data, and/or a speaker 126 (or other audio output) to present audio. The content producer 102 may include various subsystems to manage the presentation of content and generation of multi-track streaming content or other streaming content. For example, the content producer 102 may include an auxiliary content subsystem 128 to request and obtain auxiliary content that is presented by the content producer 102 and optionally included in a streaming content item being produced by the content producer 102, and a stream generation subsystem 130 to generate a content stream (e.g., a multi-track stream) from one or more input sources and manage transmission of the content stream to the content management system 100. The auxiliary content subsystem 128 and/or stream generation subsystem 130 may be implemented in hardware, or in a combination of hardware and software. For example, computer-executable instructions may be loaded into computer-readable memory and executed by one or more processors of a computing device 120 to provide the functionality of the auxiliary content subsystem 128 and/or stream generation subsystem 130.

In an illustrative example, a user may wish to generate a multimedia stream of activities occurring near and/or within the content production system 102. The user may wish to distribute a compilation of all of these forms of content substantially as the user experiences them during content production: as a single synchronized live stream of multimedia content. The camera 122 may generate video data 202 regarding objects or events captured by the camera 122. The video data 202 may be provided to the stream generation subsystem 130 for use in generating streaming content such as a multi-track data stream. Although only one camera 122 is shown, in some embodiments additional cameras 122 and/or alternative components may be used to generate video data 202. For example, a screen capture component (not shown) may be used to generate video data 202 regarding content presented on a display of the computing device 120. A microphone 124 may generate audio data 204 regarding utterances or other sounds captured by the microphone 124. The audio data 204 may be provided to the stream generation subsystem 130 for use in generating streaming content such as a multi-track data stream. Although only one microphone 124 is shown, in some embodiments additional microphones 124 and/or alternative components may be used to generate audio data 204. For example, a system audio capture component (not shown) may be used to generate audio data 204 associated with content presented on a display of the computing device 120. An auxiliary content subsystem 128 may generate auxiliary content data regarding auxiliary content presented during production of the content. The auxiliary content data may be used to present auxiliary content to the user (e.g., via speaker 126) and also request that the content management system 100 include the auxiliary content in the streaming content item being generated. Illustratively, the auxiliary content may be auxiliary audio, such as music selected by the user to be included in the content.

As shown in FIG. 1, the content producer 102 may generate and transmit streaming content to the content management system 100. In some embodiments, the streaming content is generated and transmitted as a multi-track data stream. For example, the content producer 102 may provide a multi-track data stream with a primary video track for all video that is to be distributed with the streaming content, a primary audio track (e.g., user commentary), and a supplemental track with an alternative audio portion or combination of audio portions (e.g., the background music, or a combination of the user commentary and background music). The streaming content may be provided to the content management system 100 for storage or output in one or more versions using one or more distribution protocols. A distribution protocol may be a live streaming distribution protocol (e.g., Hypertext Transfer Protocol Live Streaming ("HLS"), Real Time Messaging Protocol ("RTMP"), Real Time Streaming Protocol ("RTSP"), Moving Pictures Experts Group-Dynamic Streaming over Hypertext Transfer Protocol ("MPEG-DASH"), etc.) in which a live stream version is provided to content consumers in substantially real-time as it is generated. Another distribution protocol may be an on-demand distribution protocol in which a saved version that is provided afterwards to content consumers "on demand" is generated (e.g., as a video on demand or "VOD" version, such as an MPEG-4 version, WMV version, etc.).

With continued reference to the illustrative embodiment shown in FIG. 1, the content analysis subsystem 110 may analyze the streaming content as it is received by from the content producer 102. In the present example, the content analysis subsystem 110 may not detect any restriction on the background music being distributed in a live stream, and therefore the distribution subsystem 114 may distribute a live stream version that includes both the commentary and the background music. However, the content analysis subsystem 110 may determine that the background music is associated with a restriction on storing the background music and distributing it for presentation on demand. Upon making this determination, the authorization manager 112 may determine one or more restriction response actions available to the content producer 102 to deal with the detected restriction. Illustratively, the restriction response actions may include one or more of: [1] indicating that the detected restriction does not apply to the present use of the content; [2] indicating that authorization for the restricted use has already been obtained; [3] obtaining authorization for the restricted use; [4] stopping inclusion of the restricted content in the content stream being produced.

The available restricted response actions may be provided to the content producer 102 for selection, and a user of the content producer 102 may make a selection to deal with the restriction. Based on the selection, the authorization management subsystem 112 may store authorization data in the authorization data store 116 regarding the selected action. For example, if the selected restriction response action is an indication that the restriction does not apply to the present use of the content, the authorization data may indicate the selection, the content to which the selection applied, the identity of the content producer 102 and/or current user account, and any other data needed to memorialize the selection and respond to subsequent restriction requests from restricted content management 106. For example, a restricted content manager 106 may submit a restriction request to the content management system 100, indicating that use of the background music in an on-demand content stream is prohibited without prior authorization. The authorization management subsystem 112 may obtain authorization data form the authorization data store 116 regarding the indication that the restriction does not properly apply. Based on this authorization data, the content management system 100 can automatically respond to the restriction request without additional communications with the content producer 102, and without affecting the stored on-demand version of the streaming content when restrictions do not properly apply.

Content Restriction Detection and Management

Figure 2:
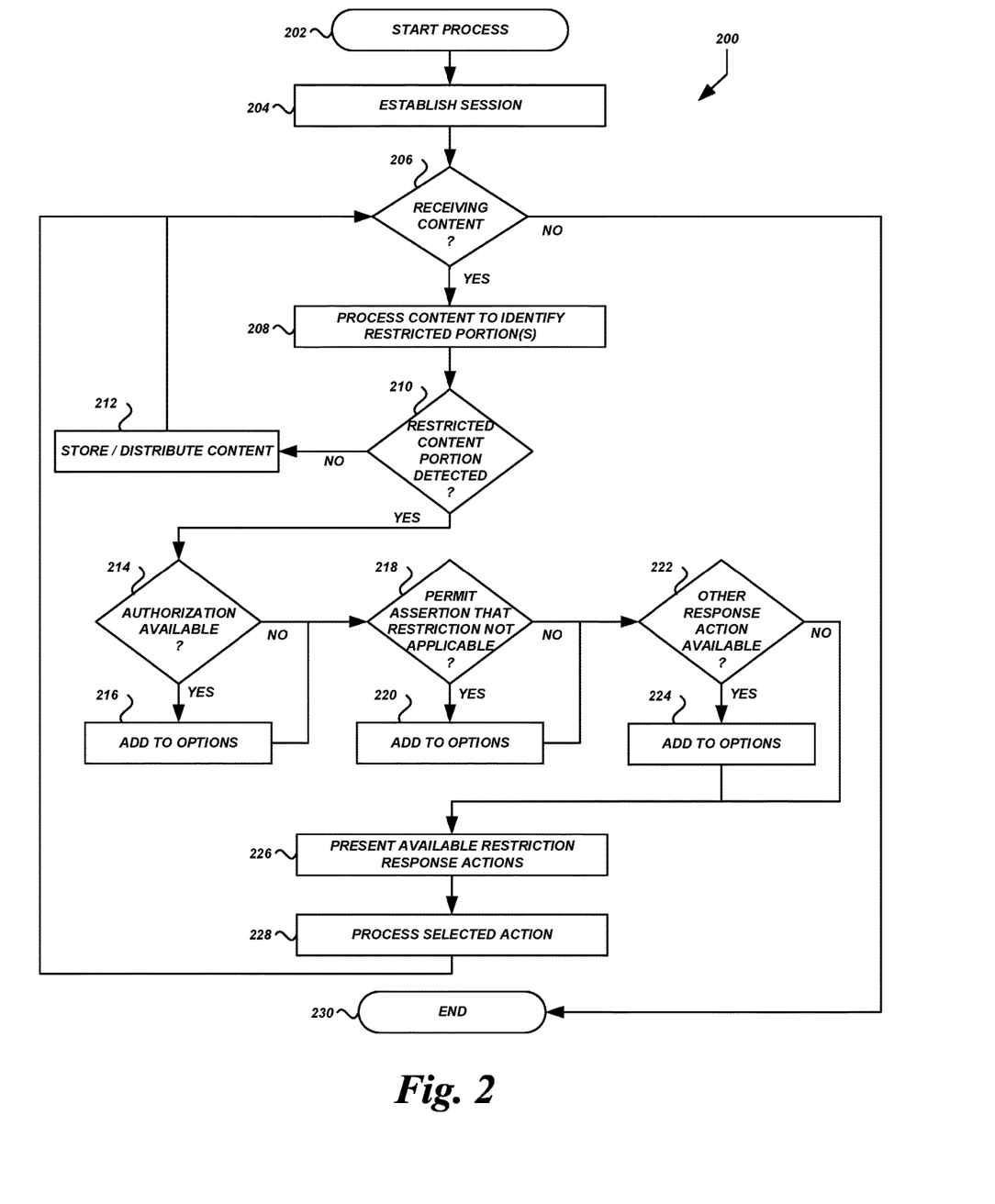
FIG. 2 is a flow diagram of an illustrative process for managing a streaming content creation session and dynamically determining and applying content restriction actions according to some embodiments.

FIG. 2 is a flow diagram of an illustrative process 200 that may be executed by the content management system 100 to manage a streaming content production session, including the detection of restricted content, the determination of available actions in response to detection of restricted content, and the implementation of selected restriction response actions that may be executed by a content management system 100. Portions of the process 200 will be described with further reference to the illustrative data flows and interactions between components of the content producer 102 and content management system 100 shown in FIGS. 3 and 4. Additional portions of process 200 will be described with reference to the illustrative user interface diagram shown in FIG. 5.

The process 200 begins at block 202. The process 200 may begin in response to an event, such as when the content management system 100 begins operation, when the content management system 100 establishes a connection with a content producer 102, or in response to some other event. When the process 200 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 600 shown in FIG. 6 and described in greater detail below. In some embodiments, the process 200 or portions thereof may be implemented on multiple processors, serially or in parallel.

At block 202, the content management system 100 can establish a streaming content creation session with a content producer 102. Establishment of the streaming content creation session may include, for example, receiving a request from a content producer 102 to begin broadcasting a live stream to content consumers 104 and/or storing content for on-demand distribution to content consumers 104. The streaming content item that is generated during the session may be referred to as the current streaming content item.

At decision block 204, the content management system 100 can determine whether streaming content is being received from the content producer 102. If not, the streaming content creation session may terminate at block 230. Otherwise, if content is being received from the content producer 102, the process 200 may proceed to block 208.

At block 208, the content management system 100 may process the received content to determine whether it is associated with any content restrictions.

In some embodiments, the content analysis subsystem 110 may analyze content that is received from the content producer 102 and determine whether the current streaming content item includes a pattern or structure that is the same as, or satisfies a similarity criterion with respect to, a pre-existing content item that is associated with restrictions. The content analysis subsystem 110 may process content in substantially real time as streaming content is being received from the content producer 102 or otherwise during production of the current streaming content item for which the current session has been established. For example, the content analysis subsystem 110 may buffer streaming content received from the content producer 102 until a sufficient amount is available to analyze. The content analysis subsystem 110 may analyze a sliding window of buffered content (e.g., 100 milliseconds of content may be analyzed, and the sliding window may advance in 50 millisecond increments so that the last 50 milliseconds of the prior window also serves as the first 50 milliseconds of the current window, etc.).

Figure 3:
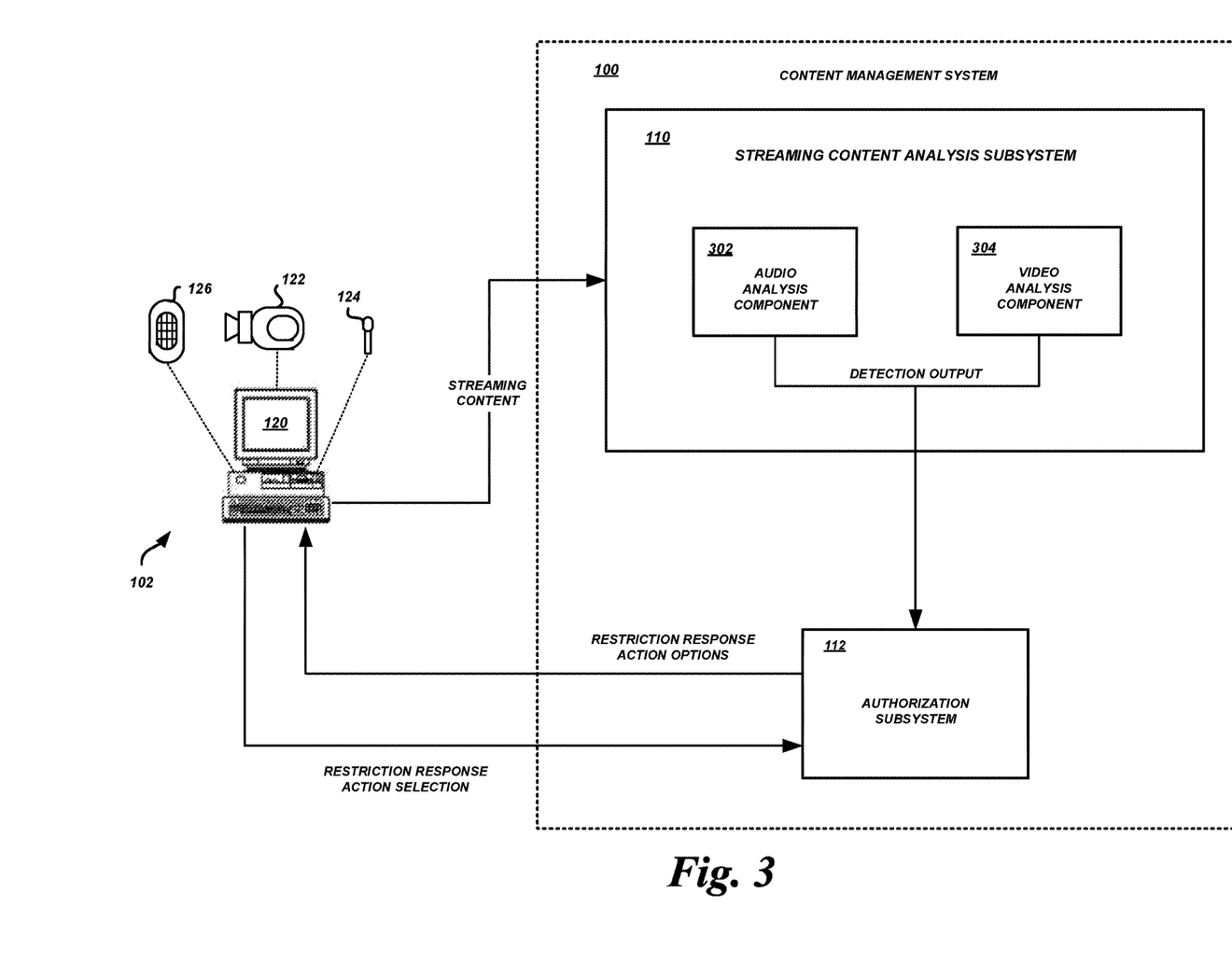
FIG. 3 is a block diagram illustrating various data flows and interactions between a content producer system and components of a streaming content analysis subsystem according to some embodiments.

FIG. 3 shows an example of the content analysis subsystem 110 analyzing streaming content 300 that is received from the content producer 102. As shown, the content analysis subsystem 110 may include one or more analysis components that analyze various portions and/or types of content and determine whether the analyzed content includes a pattern or structure that is the same as, or satisfies a similarity criterion with respect to, a pre-existing content item that is associated with restrictions. In the illustrated example, the content analysis subsystem 110 includes an audio analysis component 302 and a video analysis component 304. The individual analysis components may be implemented as separate hardware devices of the content analysis subsystem 110 (e.g., separate computer servers or processors), or as separate combinations of hardware and software.

In some embodiments, one or more analysis components may be provided by a separate system with which the content analysis subsystem 110 interacts, such as a separate network-accessible system that provides content analysis and restricted content detection services. For example, a system external to the content management system 100 may include a streaming content analysis system with one or more content analysis components. The content management system 100 may provide content to such an external content analysis system and/or the content may be provided to the external content analysis system directly from the content producer 102. When such an external content analysis system detects content that is associated with a restriction on usage, the external content analysis system may provide a notification to the content management system 100 regarding the detected restriction. Based on the notification, the content management system 100 may determine that content associated with a restriction is being included in the current streaming content item.

The audio analysis component 302 may analyze an audio portion of the streaming content 300 received from the content producer 102. For example, if the streaming content 300 is a multi-track data stream, the content analysis subsystem 110 may use the audio analysis component 302 to analyze any audio tracks. As another example, if the streaming content 300 is a collection of separate streams, the content analysis subsystem 110 may use the audio analysis component 302 to analyze any audio streams.

In some embodiments, the audio analysis component 302 may have a database of identifying information for pre-existing audio content items that are associated with restrictions. The audio analysis component 302 may analyze an audio portion of the streaming content 300 using the identifying data to determine if the audio portion is, or includes, any pre-existing audio content item associated with a restriction. For example, identifying information for a given pre-existing audio content item may be data representing a digital pattern or structure, such as a digital fingerprint, that can be used to identify the presence of the pre-existing content item. If the content being analyzed by the audio analysis component 302—an audio portion of the streaming content 300 in this example—includes data that is the same as the identifying data for the pre-existing content item, or similar to a degree that satisfies a similarity criterion, then the audio analysis component 302 may generate detection data representing the detected presence of the pre-existing content item.

The video analysis component 304 may analyze a video portion of the streaming content 300 received from the content producer 102. For example, if the streaming content 300 is a multi-track data stream, the content analysis subsystem 110 may use the video analysis component 304 to analyze any video tracks. As another example, if the streaming content 300 is a collection of separate streams, the content analysis subsystem 110 may use the video analysis component 304 to analyze any video streams.

In some embodiments, the video analysis component 304 operate in a manner that is similar to the audio analysis component 302. For example, identifying information for a given pre-existing video content item may be data representing a digital pattern or structure, such as a digital fingerprint, that can be used to identify the presence of the pre-existing content item. If the content being analyzed by the video analysis component 304—a video portion of the streaming content 300 in this example—includes data that is the same as the identifying data for the pre-existing content item, or similar to a degree that satisfies a similarity criterion, then the video analysis component 304 may generate detection data representing the detected presence of the pre-existing content item.

The example analysis components described herein are illustrative only, and are not intended to be limiting. In some embodiments, the content analysis subsystem 110 may use additional and/or alternative analysis components may be used. For example, separate video-based analysis components may be used for static pre-existing video content (e.g., movies, television shows) and dynamic pre-existing video content (e.g., video games).

In some embodiments, the content analysis subsystem 110 may analyze content that is requested by the content producer 102 to be included in the current streaming content item. The content analysis subsystem 110 may use data associated with the requested content rather than—or in addition to—analyzing the requested content item itself to determine whether the requested content is associated with restrictions against usage, what the restrictions are, and/or what restriction response actions may be available.

Figure 4:
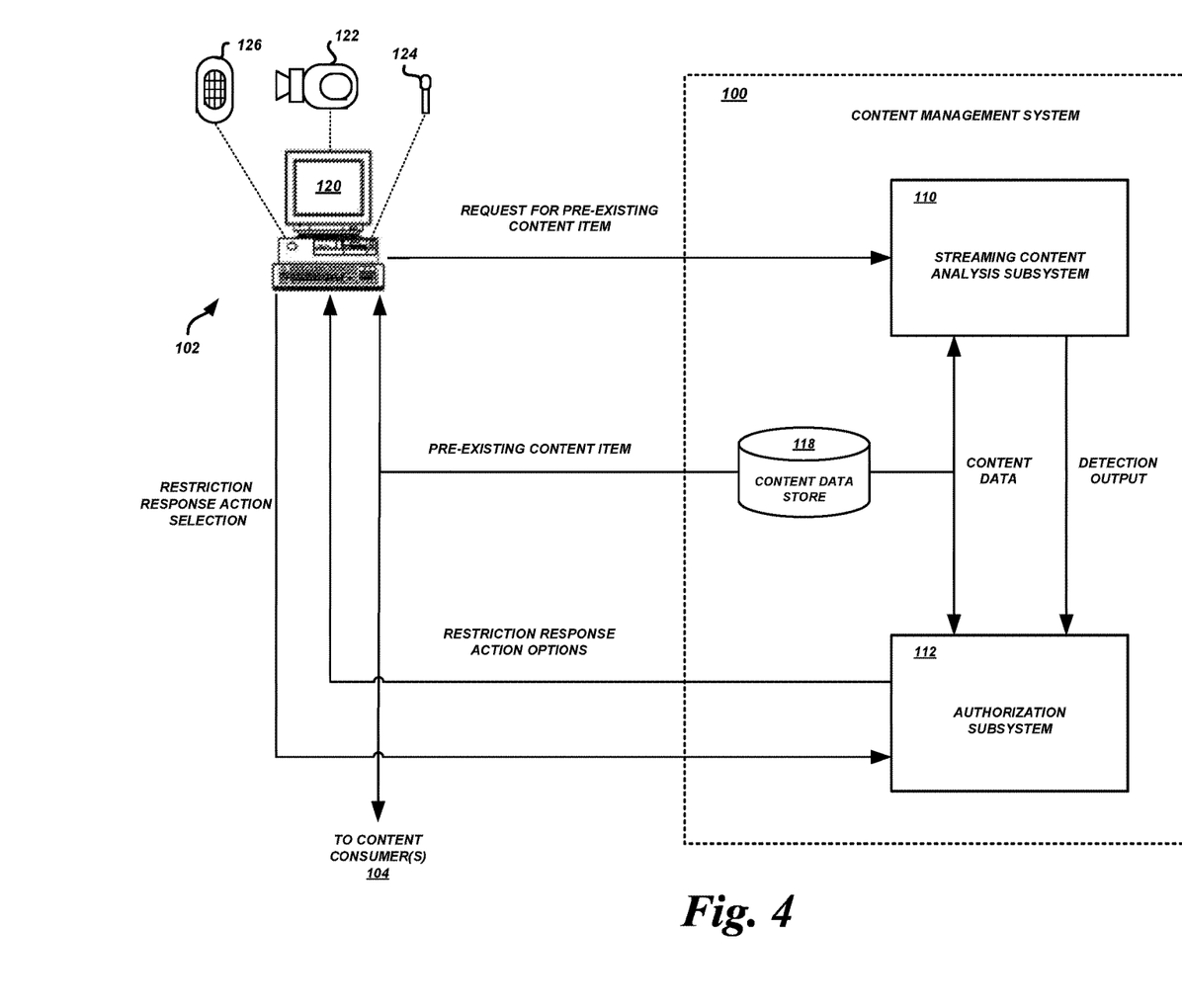
FIG. 4 is a block diagram illustrating various data flows and interactions between a content producer system, a streaming content analysis subsystem, and an authorization subsystem according to some embodiments.

FIG. 4 illustrates an example of the content analysis subsystem 110 analyzing data associated with content that the content producer 102 has requested to be included in the streaming content item being created. As shown, content producer 102 may send a request to the content management system 100 for a pre-existing content item, hosted by or otherwise accessible to the content management system 100, to be included in the current streaming content item. The request may identify the pre-existing content item to be included, such as a musical recording available through the content management system's streaming music service. The pre-existing content item may be added to the current streaming content item, such as by including it in a corresponding track of a live stream being distributed to content consumers 104 and/or including it in the version being stored for subsequent on demand streaming. In addition, the content management system 100 may provide the requested pre-existing content item (the musical recording in this example) to the content producer 102 for presentation during generation of the current streaming content item. This can be done so that the content producer 102 user is experiencing the content in the same way, and at the same relative point in the current streaming content item, as content consumers 104.

The content analysis subsystem 110 may obtain metadata associated with the requested pre-existing content item, such as from a content data store that stores pre-existing content items, metadata regarding such content items, etc. The content analysis subsystem 110 may analyze the metadata against a database of information regarding content items that are associated with restrictions on usage. If the requested pre-existing content item is associated with restrictions on usage that are applicable in the present case, then the content analysis subsystem 110 may generate detection data representing the detected presence of the pre-existing content item.

Returning to decision block 210 in FIG. 2, if the content analysis subsystem 110 does not detect the presence of (or a request to add) restricted content in the current streaming content item being generated, the process 200 may proceed to block 212 to store and/or continue to distribute the current streaming content item. Otherwise, if the content analysis subsystem 110 does detect the presence of (or a request to add) restricted content in the current streaming content item, the process 200 may proceed to decision block 214.

At decision block 214, the authorization subsystem 112 can determine whether there is an authorization available for the content producer 102 to obtain in order keep the restricted content item in the current streaming content item. Authorization may be available to the content producer 102 as an on-demand, "just-in-time" authorization at the time of content creation. To determine whether such authorization is available, the authorization subsystem 112 can analyze restriction data associated with the pre-existing content item present in—or being added to—the current streaming content item. For example, if the content analysis subsystem 110 accessed a database of information regarding restricted content items during the restricted content item detection process, the database may also include restriction data that includes details regarding the nature of the restriction, whether authorization or other restriction response actions are available and/or permitted to be used, the nature of the available authorization, and the like.

In some embodiments, authorizations available for a particular restricted content item may include one or more of: a limited authorization to use the restricted content item a particular way or limited number ways, such as only as part of a live stream content item but not in an on-demand content item; a multi-use authorization to use the restricted content item in multiple manners and/or delivery methods, such as both a live stream content item and an on-demand content item; a full authorization to use the restricted content item not just in the current streaming content item, but in future streaming content items and/or in uses outside of the content management system 100 altogether; other authorization types; or some combination thereof. In some embodiments, the available authorizations may be specific to a particular pre-existing content item, common to a group of pre-existing content items (e.g., to all pre-existing content items associated with a common source and/or a common restricted content manager 106), and/or available to all pre-existing content items.

If any authorizations are available for the restricted content item, the process 200 may proceed to block 216 where the authorization manager 112 adds the available authorization(s) to a set of options to be presented to the content producer 102. Otherwise, if no authorizations are available, the process 200 may proceed to decision block 218.

At decision block 218, the authorization subsystem 112 can determine whether a content producer account is permitted to indicate that the identified restriction does not apply. The user of the content producer 102 may be associated with a content producer account for the content management system 100. The content producer account may be used to manage and track information about the user, streaming content items generated by the user, length of time that the user is an account holder, account access groups or tiers with which the account is associated, and the like.

In some embodiments, authorizations that are available to the user to keep or include a restricted content item in the current streaming content item may be dynamically determined based on aspects of the user account that is currently being used by the content producer 102, aspects of the restricted content, and/or aspects of the current streaming content item. Thus, when a restricted content item is detected and the authorization subsystem 218 is determining which restriction response actions are available, the authorization subsystem 218 may determine whether one or more properties of the content producer user account, restricted content, and/or current streaming content item satisfy one or more criteria associated with a restriction response action that may be available. For example, if a user account has been active for a threshold period of time or is associated with a particular account group or tier, then a restriction response action such as indicating that the restriction does not apply (e.g., the restriction is a copyright restriction, and the user is permitted to assert that the current use of the otherwise restricted content item is fair use) may be available to the user. If the user account has not been active for the threshold period of time or is not associated with the particular account group or tier, then that particular restriction response action may not be available. As another example, the content management system 100 may store historical data regarding prior assertions, by a user account, of authorization and/or that restrictions do not otherwise apply. Data regarding subsequent restriction requests to the content management system by restricted content managers 106 may also be stored, indicating that use of content by the user account is prohibited without prior authorization content. A restriction request may cause initiation of a workflow whereby the user account's assertion of authorization (or that a restriction does not apply) is analyzed in connection with information provided by the restricted content manager. If a determination is made that the user account made a valid assertion, then data regarding the correct assertion is stored. If a determination is made that the user account made an invalid assertion, data regarding the incorrect assertion is stored. User accounts that are associated with a threshold quantity and/or threshold percentage of valid assertions may be permitted to continue making assertions that restrictions do not apply, or may be permitted to make such asserts more often than user accounts that fail to have a threshold quantity and/or percentage of valid assertions.

In some embodiments, additional and/or alternative factors may be considered when determining whether a content producer account is permitted to indicate that the identified restriction does not apply. For example, factors such as the duration of use of the restricted content item (e.g., as an absolute quantity or as a percentage of the restricted content item), the type of the restricted content item (e.g., audio may have different restriction requirements than video), country of use (e.g., different countries to which the current streaming item is being created may result in different restrictions), country of consumption (e.g., different countries to which the current streaming item is to be live streamed and/or streamed on demand may result in different restrictions), transformative nature of use (e.g., sampling a restricted content item may implicate different restrictions than transforming the restricted content item), other factors, or some combination thereof may be considered. The authorization subsystem 112 may apply one or more criteria to one or more of these factors to determine whether a content producer account is permitted to indicate that the identified restriction does not apply.

If the user account is permitted to select an authorization as determined at decision block 218, the process may proceed to block 220 where the authorization manager 112 adds the restriction response action to a set of options to be presented to the content producer 102. Otherwise, if no restriction response actions are available, the process 200 may proceed to decision block 222.

At decision block 222, the authorization subsystem 112 can determine whether there are any other restriction response actions available in the present case. In some embodiments, a user of a content producer 102 may be permitted to indicate that the user has already obtained authorization to use the restricted content item in the manner it is currently being used. A restriction response action that may be available to the user may be to provide details of the prior authorization (in contrast to obtaining authorization on demand and just-in-time as described above). For example, if the user has an account with a third party authorization service, the user may provide evidence that the user has obtained the appropriate authorizations, such as by linking the user's account with the content management system 100 to the user's account with the third party authorization service, requesting the third party authorization service to confirm that the user has obtained authorization, or in some other manner. In some embodiments, other restriction response actions may be available. For example, a default restriction action that is available in all situations may be that the restricted content item can be stopped or otherwise excluded from the current streaming content item.

If any restriction response actions are identified at decision block 222, the process may proceed to block 224 where the authorization manager 112 adds the available restriction response action(s) to the set of options to be presented to the content producer 102. Otherwise, if no restriction response actions are available, the process 200 may proceed to block 226.

At block 226, the authorization manager 112 can cause presentation of the available restriction response actions by the content producer 102. Notification data representing the detected restriction and the available restriction response actions can be sent to the content producer 102 so that a user of the content producer 102 can be presented with selectable options in response to the detected restriction that prevents some usage of a content portion in—or requested to be added to—the current streaming content item. For example, the authorization manager 112 may generate markup language instructions, such as Hypertext Markup Language ("HTML") instructions for an interactive graphical user interface to be presented by the content producer 102. As another example, the authorization manager 112 may provide application data via an application programming interface ("API") to an application executing on the content producer 102, such as the stream generation subsystem 130, to generate and present an interactive graphical user interface with the available restriction response options.

Figure 5:
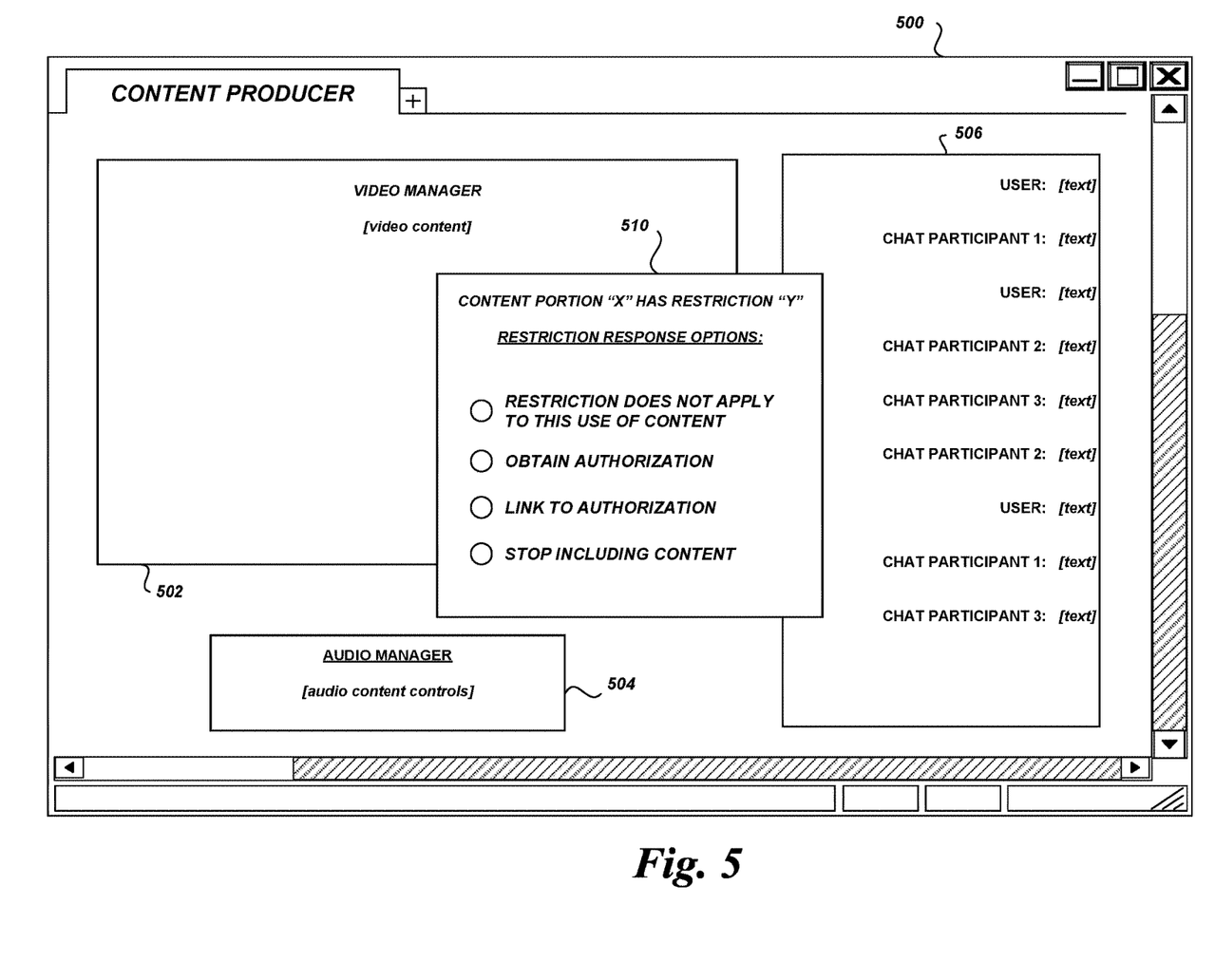
FIG. 5 is a diagram of a user interface illustrating restriction response action available for selection and application.

FIG. 5 illustrates an example user interface 500 that may be presented by a content producer 102. The interface 500 may include various content management panels for monitoring and managing generation of the current streaming content item. For example, a video panel 502 may present the current output of a video camera or other video content (e.g., a video game) that is being added to the current streaming content item, an audio panel 504 may provide controls for managing the output of a microphone and/or other audio content (e.g., auxiliary audio streamed from the content management system 100) that is being added to the current streaming content item, a chat panel 506 to manage a chat associated with a live stream, and/or various other panels.

If the content management system 100 detects the presence of a restricted content item in—or requested to be added to—the current streaming content item, a panel 510 of restriction response actions may be presented. The panel 510 may be interactive and present selectable options of restriction response actions, determined by the authorization manager 112 as described in greater detail herein. If a user of the content producer 102 selects one of the options, interaction data can be sent to the authorization subsystem 112 or some other component of the content management system 100 indicating the selected restriction response action to be executed.

Advantageously, the panel 510 may be presented in substantially real time, while the current streaming content item is being created and while the restricted content is being included in the current streaming content item. If the content management system 100 is requested to include the restricted content item, the panel 510 of restriction response options may be presented before any restricted content is even included in the current streaming content item. Thus, the user of the content producer 102 can receive faster, if not nearly instantaneous notification that content being included in the current streaming content item is restricted. Such real time notification can result in better streaming content items, including streaming content items that are not reactively blocked, muted, or otherwise altered in a way that could be avoided through use of aspects of the present disclosure.

Returning to process 200, at block 228 the authorization subsystem 112 can process the selected restriction response action. If the selected restriction response action is to obtain just-in-time authorization, the authorization subsystem 112 may generate and store authorization data in the authorization data store 116 indicating the acquisition of the appropriate authorization. If the selected restriction response action is to indicate that the restriction does not apply in the present case, the authorization subsystem 112 may generate and store authorization data in the authorization data store 116 indicating the content producer user has made this assertion. If the selected restriction response action is to assert previously-obtained authorization, the authorization subsystem 112 may generate and store authorization data in the authorization data store 116 linking or otherwise indicating the previously-obtained authorization. If the selected restriction response action is to stop including the restricted content in the current streaming content item, the distribution subsystem 114 or some other component of the content management system 100 can block the restricted content from inclusion in the current streaming content item.

In some embodiments, a selected restriction response action may be time limited. In such cases, the authorization subsystem 112 can set an effective time period for the action or indicate an expiration in some other manner. During this time period, any detection of restriction for the same restricted content item may be suppressed, or analysis to detect the same restricted content item may be suppressed. When the action has expired (e.g., after passage of the effective time period), detection of the restricted content and presentation of restriction response actions for the content item may be reenabled. In some embodiments, detection of other restricted content items may continue during the effective time period. Thus, the effective time period only results in suppression of continued detections and restriction notifications for the same content item. In this scenario, if a second restricted content item (e.g., a song by artist b) is detected during the time period that is in effect to suppress repeat detection of a first restricted content item (e.g., a song by artist a), the detection of the second restricted content item is not suppressed. In some embodiments, the time period to suppress a restriction of a particular content item, before a restriction of the same content item is raised to the user, may be determined based on aspects of the restricted content item. For example, the time period may be statistically associated with a content item or class of content items (e.g., a time period of x minutes for each audio clip, a longer period of y minutes for a video clip, etc.). As another example, the time period may be dynamically determined as a percentage of the total running time of the restricted content (e.g., a time period of x minutes for a short audio clip, a longer period of y minutes for a longer audio clip, etc.). The example time periods and methods of determination are illustrative only, and not intended to be limiting, required, or exhaustive.

Additional Embodiments

Although many of the examples described herein relate to transmission of a multi-component stream from a content production system 102 to a separate content management system 100, in some embodiments the two systems (or individual components thereof) may be combined into a single system. For example, the content production system 102 may be configured to provide the functionality of the content analysis subsystem 110, authorization subsystem 112, and/or various other subsystems described herein.

Although many of the examples described herein relate to multi-component data streams with a given number of video tracks (e.g., one) and a given number of audio tracks (at most two), the quantity and nature of the tracks in the examples are not intended to be exhaustive, limiting, or required. In some embodiments, a multi-component data stream may have two or more video tracks, one audio track, three or more audio tracks, or any combination thereof. For example, audio tracks for different languages may be included, video tracks from different angles or in different viewing resolution may be included, etc. In some embodiments, a multi-component data stream may also or alternatively include other data, such as text for closed caption display. The inclusion and/or exclusion operations for particular tracks and particular versions may operate in the same or a similar manner regardless of the nature of the specific tracks.

Execution Environment

Figure 6:
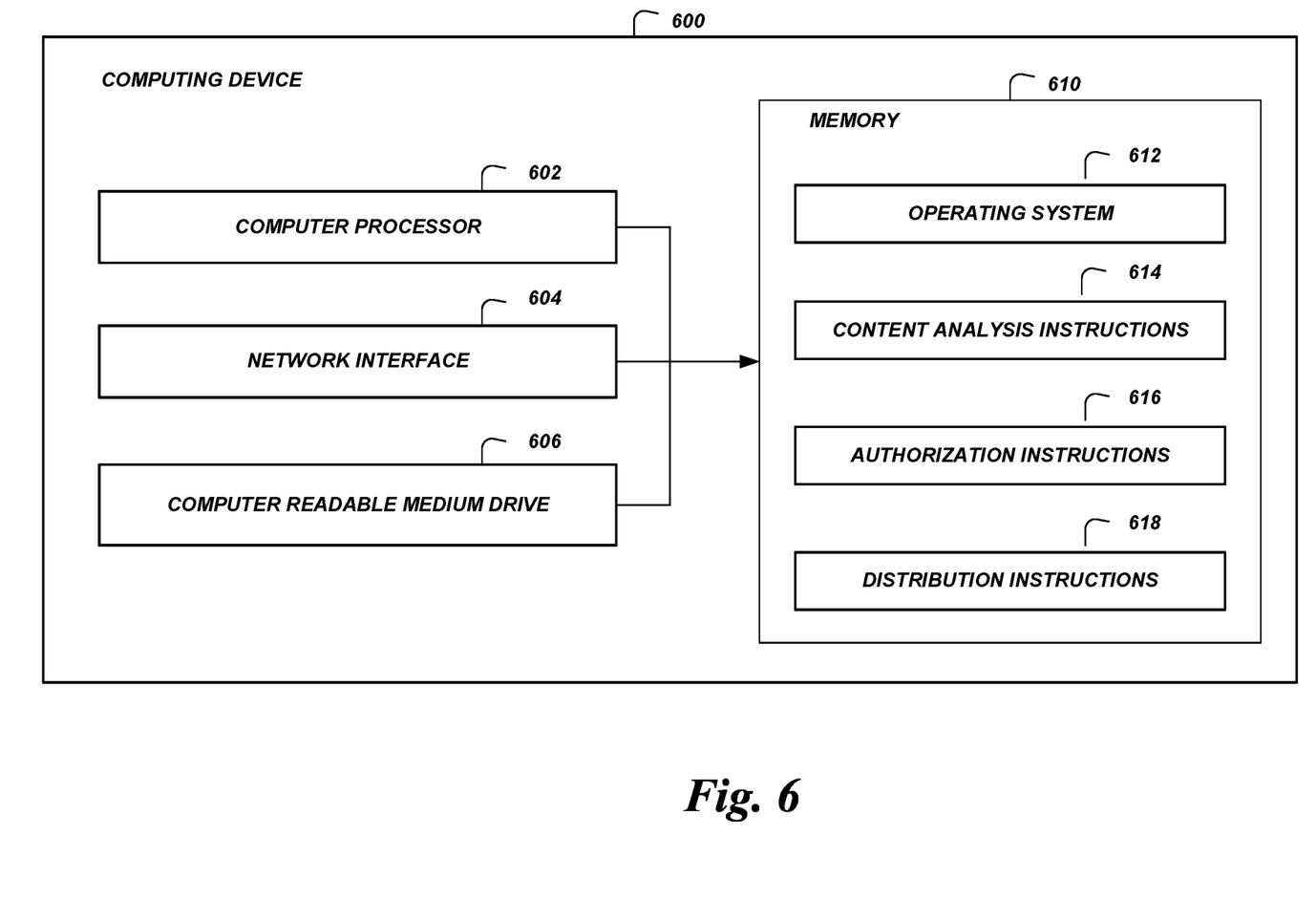
FIG. 6 is a block diagram illustrating components of a computing device configured to execute processes for managing streaming content and associated restrictions according to some embodiments.

FIG. 6 illustrates the various components of an example computing device 600 configured to implement various functionality of the content management system 100. In some embodiments, as shown, the computing device 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; and one or more computer readable memories 610, such as random access memory ("RAM") and/or other volatile non-transitory computer-readable media.

The computer readable memory 610 may include computer program instructions that one or more computer processors 602 execute in order to implement one or more embodiments. The computer readable memory 610 can store an operating system 612 that provides computer program instructions for use by the computer processor(s) 602 in the general administration and operation of the computing device 600. In some embodiments, the computer readable memory 610 can further include computer program instructions and other information for implementing aspects of the present disclosure. For example, in one embodiment, the computer-readable memory 610 may include content analysis instructions 614 for implementing features of the content analysis subsystem 110, authorization instructions 616 for implementing features of the authorization subsystem 112, distribution instructions 618 for implementing features of the distribution subsystem 114, etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might." "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including," "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A content management system comprising:
a content data store storing a plurality of previously-generated content items; and
one or more computing devices programmed by executable instructions to at least:
establish a streaming content production session to generate a streaming content item, wherein the streaming content production session comprises receipt of a first content portion of the streaming content item from a content production system in substantially real time as the content production system produces the first content portion;
analyze the first content portion using a streaming content analysis subsystem to determine whether the first content portion is associated with a first restriction preventing usage in the streaming content item;
receive, from the content production system, a request to include a second content portion in the streaming content item, wherein the second content portion comprises a previously-generated content item of the plurality of previously-generated content items;
determine whether the second content portion is associated with a second restriction preventing usage in the streaming content item;
determine a plurality of restriction response actions based on one of the first content portion or the second content portion being associated with a detected restriction preventing usage in the streaming content item, wherein the plurality of restriction response actions comprise a first restriction response action in which the content production system indicates the detected restriction does not apply, and a second restriction response action in which the content production system obtains authorization for usage in the streaming content item, wherein the plurality of restriction response actions are determined based at least in part on the detected restriction preventing usage, wherein the plurality of restriction response actions are automatically selected from among a plurality of existing potential restriction response actions, wherein the plurality of restriction response actions are automatically selected based on account information associated with the content production system, and wherein the account information comprises a timespan of account membership;
send notification data to the content production system representing the detected restriction in substantially real time as the content production system produces the first content portion, wherein the notification data further represents the plurality of restriction response actions to the content production system; and
generate authorization data based on a response to the notification data, wherein the authorization data represents a selected restriction response action of the plurality of restriction response actions.

2. The content management system of claim 1, wherein the one or more computing devices programmed to analyze the first content portion using the streaming content analysis subsystem are programmed by further executable instructions to determine whether the first content portion comprises a digital fingerprint of a restricted content item, wherein the restricted content item is associated with the first restriction preventing usage in the streaming content item.

3. The content management system of claim 1, wherein the one or more computing devices programmed to determine whether the second content portion is associated with the second restriction are programmed by further executable instructions to analyze metadata associated with the previously-generated content item.

4. A computer-implemented method comprising,
under control of one or more computing devices configured with specific computer executable instructions,
determining, during production of a streaming content item comprising content being received from a content production system in substantially real time as the content is being created by the content production system, that a portion of the streaming content item is associated with a restriction regarding usage in the streaming content item;
determining, based on the restriction regarding usage in the streaming content item, one or more restriction response actions available to the content production system to be taken in response the restriction regarding usage in the streaming content item, wherein the one or more restriction response actions are automatically selected from among a plurality of existing potential restriction response actions based on the restriction regarding usage determined from among a plurality of potential restrictions regarding usage, wherein the one or more restriction response actions are automatically selected based on account information associated with the content production system, and wherein the account information comprises a timespan of account membership;
causing presentation of one or more selectable options by the content production system, wherein a selectable option of the one or more selectable options corresponds to a restriction response action of the one or more restriction response actions, and wherein the one or more selectable options are presented by the content production system in substantially real time as the content is being received from the content production system; and
executing a selected restriction response action corresponding to a selected option of the one or more selectable options.

5. The computer-implemented method of claim 4, wherein determining that the portion of the streaming content item is associated with the restriction regarding usage in the streaming content item comprises analyzing the portion of the streaming content item using a streaming content analysis subsystem in substantially real-time during receipt of the portion of the streaming content item from the content production system, wherein the portion of the streaming content item comprises one of an audio track of a multi-track data stream, or a video track of the multi-track data stream.

6. The computer-implemented method of claim 5, wherein analyzing the portion of the streaming content item using the streaming content analysis subsystem comprises detecting, in the portion of the streaming content item, a digital fingerprint of a pre-existing content item associated with the restriction regarding usage in the streaming content item.

7. The computer-implemented method of claim 4, further comprising:
receiving, from the content production system, a request for a pre-existing content item to be included in the streaming content item;
sending the pre-existing content item to the content production system, wherein the content production system presents the pre-existing content item during production of the streaming content item; and
including the pre-existing content item in the streaming content item for one of: storage of the streaming content item for on-demand streaming, or distribution of the streaming content item as a live stream.

8. The computer-implemented method of claim 7, wherein determining that the portion of the streaming content item is associated with the restriction regarding usage in the streaming content item comprises analyzing metadata associated with the pre-existing content item.

9. The computer-implemented method of claim 4, wherein determining, based on the restriction regarding usage in the streaming content item, the one or more restriction response actions comprises obtaining data regarding an on-demand authorization associated with portion of the streaming content item, wherein based on selection of the on-demand authorization, the portion of the streaming content item is authorized for usage in the streaming content item.

10. The computer-implemented method of claim 4, wherein determining, based on the restriction regarding usage in the streaming content item, the one or more restriction response actions comprises determining to include a restriction response action in which the content production system indicates the restriction regarding usage in the streaming content item does not apply.

11. The computer-implemented method of claim 10, wherein executing the selected restriction response action comprises storing data indicating the restriction regarding usage in the streaming content item does not apply.

12. The computer-implemented method of claim 10, wherein executing the selected restriction response action comprises:
determining, based at least partly on the portion of the streaming content item associated with the restriction regarding usage, a period of time during which the restriction regarding usage is to be suppressed; and
suppressing the restriction regarding usage for the period of time.

13. A system comprising:
computer-readable memory storing executable instructions; and
one or more computing devices in communication with the computer-readable memory and programmed by the executable instructions to at least:
determine, during production of a streaming content item comprising content being received from a content production system in substantially real time as the content is being created by the content production system, that a portion of the streaming content item is associated with a restriction regarding usage in the streaming content item;
determine, based on the restriction regarding usage in the streaming content item, one or more restriction response actions available to the content production system to address the restriction regarding usage in the streaming content item, wherein the one or more restriction response actions are automatically selected from a plurality of existing restriction response actions based on the restriction regarding usage, wherein the one or more restriction response actions are automatically selected based on account information associated with the content production system, wherein the account information comprises a timespan of account membership, and wherein the restriction regarding usage is one of a plurality of potential restrictions regarding usage;
cause presentation of one or more selectable options by the content production system, wherein a selectable option of the one or more selectable options corresponds to a restriction response action of the one or more restriction response actions, and wherein the one or more selectable options are presented by the content production system in substantially real time as the content is being received from the content production system; and executing a selected restriction response action corresponding to a selected option of the one or more selectable options.

14. The system of claim 13, wherein the one or more computing devices are programmed by further executable instructions to receive, from an external content analysis system, a notification that the portion of the streaming content item is associated with the restriction regarding usage, wherein the one or more computing devices determine that the portion of the streaming content item is associated with the restriction regarding usage based on receiving the notification from the external content analysis system.

15. The system of claim 13, wherein the one or more computing devices are programmed by further executable instructions to include, in the one or more restriction response actions, a restriction response action in which the content production system indicates the restriction regarding usage in the streaming content item does not apply.

16. The system of claim 15, wherein to execute the selected restriction response action, the one or more computing devices are programmed by further executable instructions to:

determine, based at least partly on the portion of the streaming content item associated with the restriction regarding usage, a period of time during which the restriction regarding usage is to be suppressed; and suppress the restriction regarding usage for the period of time.

17. The system of claim 16, wherein the one or more computing devices are programmed by further executable instructions to:

determine, during the period of time, that a second portion of the streaming content item is associated with a second restriction regarding usage in the streaming content item, wherein the second portion comprises a different content item than the portion of the streaming content item; and determine that the second restriction is not to be suppressed.

18. The system of claim 13, wherein a second restriction regarding usage of the plurality of potential restrictions regarding usage is associated with a second set of one or more restriction response actions different from the one or more restriction response actions.

19. The system of claim 13, wherein the account information comprises an account type.

* * * * *